United States Patent [19]

Brady

[11] 4,228,964
[45] Oct. 21, 1980

[54] APPARATUS FOR PROCESSING CELLULOSE INSULATION

[75] Inventor: John H. Brady, Broomfield, Colo.

[73] Assignee: Easy Engineering Corporation, Broomfield, Colo.

[21] Appl. No.: 903,685

[22] Filed: May 8, 1978

[51] Int. Cl.³ .................... B02C 13/284; B02C 13/282
[52] U.S. Cl. ............................. 241/186.3; 241/186.2; 241/186 R
[58] Field of Search ............. 241/186 R, 186.2, 186.3, 241/185 R, 189 R

[56] References Cited

U.S. PATENT DOCUMENTS

| | | | |
|---|---|---|---|
| 1,384,821 | 7/1921 | Blum | 241/189 R |
| 2,291,815 | 8/1942 | Korum | 241/186.2 |
| 2,637,502 | 5/1953 | Bond | 241/186 R |
| 2,828,923 | 4/1958 | Kramer | 241/190 |
| 2,837,290 | 6/1958 | Nagel | 241/186.3 |
| 2,869,793 | 1/1959 | Montgomery | 241/186 R |
| 3,430,873 | 3/1969 | Wahl et al. | 241/186 |

*Primary Examiner*—Richard B. Lazarus
*Attorney, Agent, or Firm*—John E. Reilly

[57] ABSTRACT

A new and useful apparatus has been devised for grinding paper into cellulose fiber insulation in which a hammermill or rotary beater has a paper feed inlet which establishes a low pressure zone at the entrance to the hammermill housing whereby to encourage reverse flow of partially ground materials from the outer perimeter of the hammermill into the low pressure zone, the partially ground material tending to collect in the form of a vortex and to recombine with the main stream of material being supplied into the feed inlet. In this way any of the partially ground or shredded material not small enough to pass through a classification grid or screen at the discharge of the hammermill will continuously intermix with the main stream of material for continuous grinding to the desired size.

10 Claims, 4 Drawing Figures

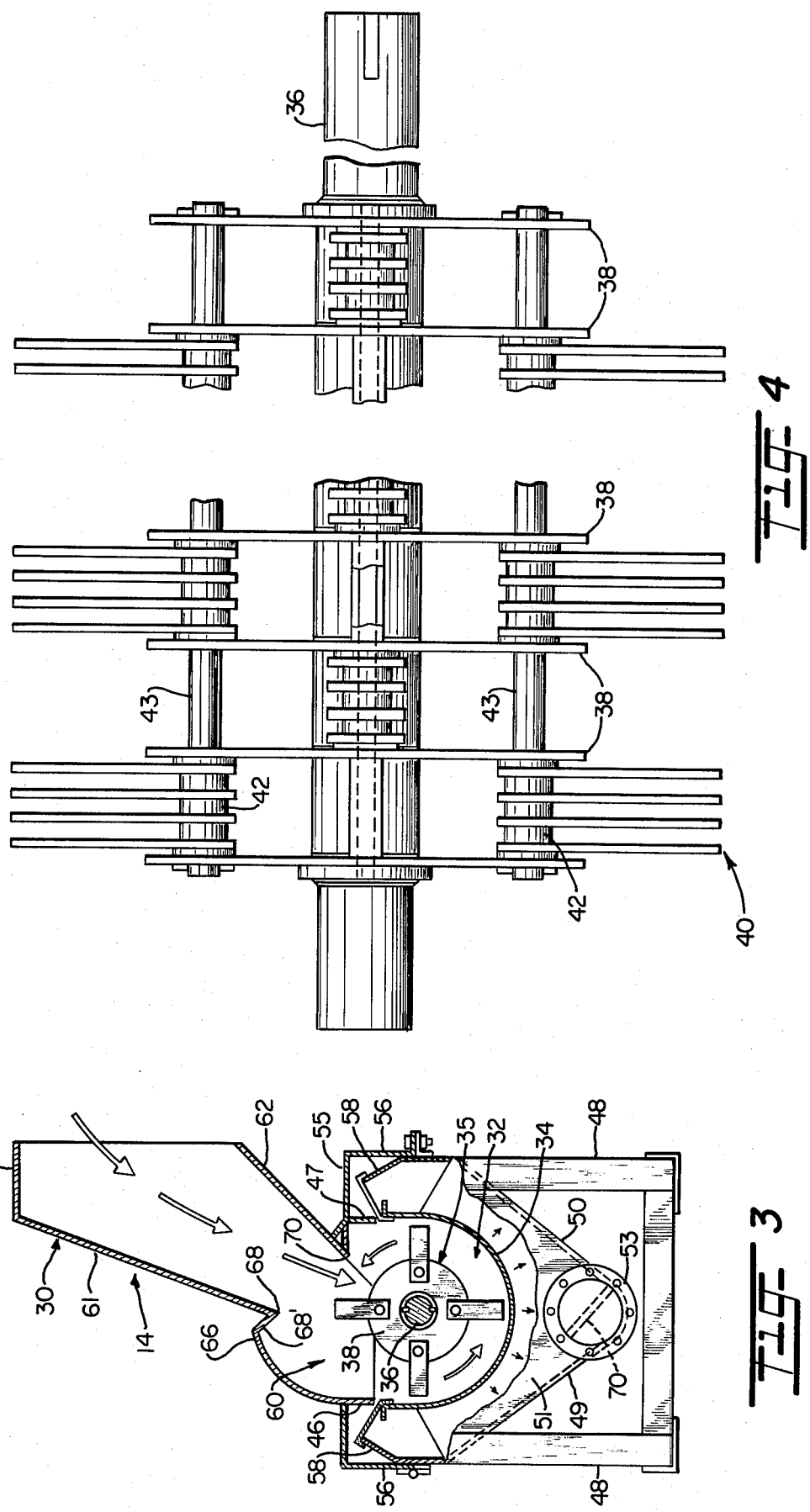

APPARATUS FOR PROCESSING CELLULOSE INSULATION

This invention relates to a novel and improved apparatus for grinding and pulverizing materials; and more particularly relates to a hammermill apparatus for processing cellulose fiber insulation materials.

BACKGROUND OF THE INVENTION

With the continuing emphasis on energy saving programs there is a great deal of interest in utilizing recycled paper or newsprint and grinding same for use as cellulose fiber insulation material. In the past, hammermills or rotary beaters have been employed for the purpose of grinding the paper down to a predetermined size, suitable fire retardant chemicals are added to the ground paper during or after grinding, and the insulation material is then bagged for shipment to the job site where it is fluffed up and blown into the space between ceiling joints or into the stud space in the outer walls. Since the ground cellulose is very bulky, freight rates are comparatively high and therefore it is not economically feasible to ship the finished product for any great distances. Accordingly, there is a demand for cellulose processing apparatus which can be installed relatively near the point of consumption or use which is relatively compact, highly efficient and durable requiring a minimum number of parts, can be easily assembled and installed and which requires a minimum of maintenance and attention.

The assignee of the present invention previously devised a cellulose insulation processing system in which recycled paper or newsprint was placed on an inclined conveyor belt and advanced into a restricted feed inlet at the upper end of a hammermill apparatus for gravity feed into the hammermill chamber. In the hammermill cylinder, a series of rotary beaters or hammers were mounted on a common shaft and were operated to grind the paper into fine particles but experienced serious problems associated with jamming both at the entrance and in the clearance space between the hammers and cylinder. Hammermill elements of the type described and their mounting for rotation on a common shaft are disclosed in the patent to E. A. Barcell U.S. Pat. No. 4,033,515 and assigned to the assignee of the present invention. As disclosed in that patent however the hammermill elements were intended for use in a feed grinder wherein the feed material to be ground, such as, hay was fed onto a relatively horizontal floor surface having a limited opening for gravity feed of the material into the hammermill chamber. The hammermill elements were pivotally mounted on discs and were rotatable between cross bars extending across the aperture to operate to break up the feed material and encourage its gravity feed into the hammermill chamber and specifically in such a way as to minimize slugging or jamming of the materials at the entrance to the chamber.

The considerations in processing of paper in making cellulose fiber insulation differ appreciably from those associated with the grinding of feed materials in that there is not so much of a slugging or jamming problem at the point of introduction of the paper into the hammermill chamber; however, as the paper is partially ground there is a tendency for it to jam or collect both at the entrance and along the clearance space formed along outer periphery of the chamber just outside of the outer radial ends of the hammermill elements. The partially ground material which is not small enough to pass through a discharge screen located in the wall of the hammermill chamber, if permitted to build up or collect, will not only clog the discharge area but also interfere with free rotation of the hammermill elements. Moreover, the centrifugal force of the hammermill elements will tend to prevent the partially ground material from intermixing with the main stream of materials acted upon by the hammermill elements.

As indicated eariler, hammermill systems have been employed in the past for processing materials other than paper or cellulose materials. For instance, to Reschke U.S. Pat. No. 1,975,406 discloses a feed mill employing hammermill elements in which the feed material which is not fully ground is thrown by centrifugal force into an upper cavity within the hammermill cylinder, and an adjustable deflector associated with that cavity causes that material to re-enter the main stream of feed material processed in the hammermill chamber. U.S. Letters Patent to Kramer U.S. Pat. No. 2,828,923 is directed more to a rigid type of hammermill specifically designed for reducing metal chips into smaller particles and discloses the use of a deflector within the chamber to encourage reverse flow of material which is not fully ground by the hammermill blades. Davidson U.S. Pat. No. 1,322,546 controls the ratio of the width of the inlet to the hammermill radius so as to minimize any tendency of the dust formed from material ground in the hammermill to be blown back out through the inlet. The above and other approaches in hammermill apparatus have not been found to be satisfactory, particularly in the treatment or processing of coarse paper, in overcoming the problem of slugging or jamming which occurs along the outer perimeter of the hammermill chamber particularly along the discharge area. It is therefore desirable to provide for a method and apparatus for efficiently grinding and processing clean, flat, dry newsprint into cellulose fiber insulation which will overcome the problems associated with slugging or jamming of the materials and assure continuous processing of materials at high rates of speed.

SUMMARY OF THE INVENTION

It is therefore an object of the present invention to provide for a novel and improved apparatus for grinding coarse paper into extremely fine particles of cellulose fiber insulation which is durable, safe and trouble-free in operation.

It is another object of the present invention to provide for a novel and improved apparatus for grinding coarse paper and the like into particles of the desired fineness or mesh size in such a way as to minimize to the point of eliminating any tendency of the materials to clog the discharge area or the beater elements and will assure the necessary intermixing and progressive grinding of the material down to particles of the desired size in a continuous, efficient manner.

It is an additional object of the present invention to provide for a single stage grinding operation for pulverizing paper and like materials into particles of the desired size and for selective removal of particles when reduced to a desired size which is capable of handling large masses of materials while causing progressive grinding and reduction without slugging or jamming of the materials within the processing chamber.

In accordance with a preferred form of the present invention, a hammermill apparatus is provided with an upper feed inlet and the apparatus is so designed as to encourage reverse flow of partially ground materials into an antechamber which is offset from the feed inlet but in direct communication therewith at the entrance to the hammermill chamber. As a result, partially ground material which collects along the outer perimeter of the hammermill chamber and is not small enough to pass through a classification grid or screen in the wall of the chamber will be encouraged to return into the low pressure zone established in the antechamber. The partially ground material collects in the antechamber in the form of a vortex so that it will be gradually thrown back into the main stream of unground materials introduced into the feed inlet for continuous grinding and pulverization. As a result any of the shredded paper not small enough to pass through the discharge grid or screen at the discharge of the hammermill will intermix with the main stream for continued grinding until it is reduced to particles of the desired degree of fineness. In addition, a deflector or baffle plate may be employed preferably adjacent to or directly ahead of the feed inlet to encourage the reverse or counterflow of partially ground materials. In the preferred apparatus, the feed inlet for coarse paper to be ground is disposed across the upper wall of the hammermill cylinder so as to permit introduction of the materials by gravity into the cylinder, and the feed inlet traverses the substantial length of the grinding cylinder so as to introduce the materials throughout its substantial length. The hammermill elements are characterized by being pivotally mounted on discs whereby the high speed rotation of the disc will cause the hammer elements to be thrown outwardly by centrifugal force as the discs are rotated at high speed. A lower discharge area or classification screen is positioned in the wall of the hammermill chamber and sufficient clearance is afforded between the hammer elements and the wall of the chamber to establish reverse or counterflow of the partially ground materials with the aid of the baffle plate in the cylinder. Again however reverse flow is induced primarily by establishing a negative pressure zone preferably in the form of an arched hood which forms an offset chamber on one side of the feed inlet at its entrance into the hammermill cylinder so that the partially ground materials will flow along the outer perimeter of the hammermill cylinder into the low pressure zone and collect in the form of a vortex for gradual re-entry into the main stream of coarse materials delivered or passing through the feed inlet.

In processing cellulose insulation, fire retardant chemical materials may be introduced either at the inlet or outlet end of the hammermill cylinder and in accordance with conventional practice the shredded materials when reduced to the desired degree of fineness are induced to flow into a classifier or cyclone for removal of dust while permitting the larger materials to pass or advance to a bagging station.

The above and other objects, advantages and features of the present invention will become more readily appreciated and understood from a consideration of the following detailed description of a preferred embodiment when taken together with the accompanying drawings in which:

BRIEF DESCRIPTION OF THE DRAWINGS

FIG. 3 is a side view partially in section illustrating the hammermill apparatus in greater detail; and FIG. 4 is an enlarged view in detail of the hammermill mechanism employed in the apparatus of the present invention.

DETAILED DESCRIPTION OF THE PREFERRED EMBODIMENT

Figure 1:
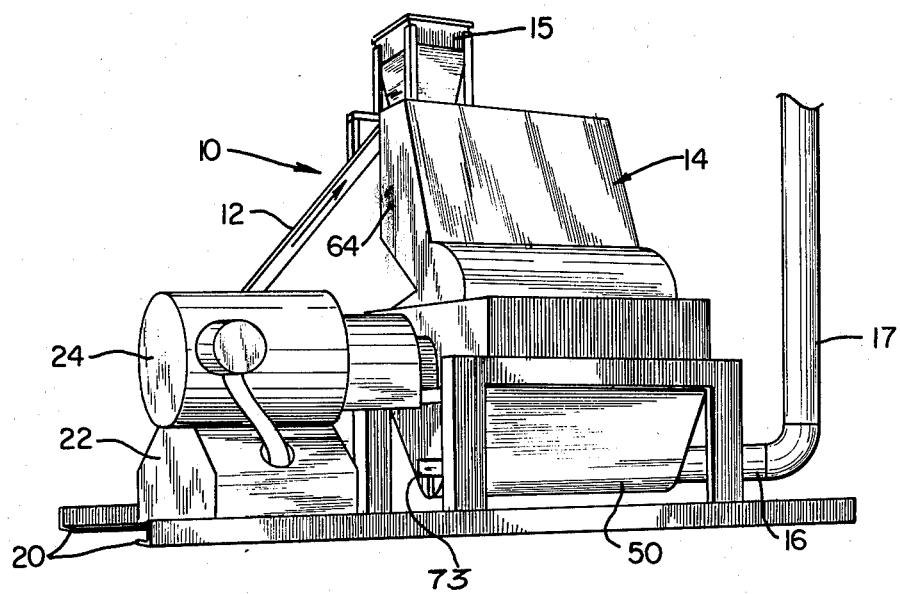
FIG. 1 is a somewhat perspective view of an insulation processing system incorporating the hammermill apparatus of the present invention.

There is shown by way of illustrative example in FIG. 1 an insulation processing system 10 which is broadly comprised of an inlet conveyor 12 for unground cellulose material such as newsprint which is to be ground or shredded into fine particles of preselected size in the formation of cellulose insulation material. The inclined conveyor travels in the direction designated by the arrows upwardly toward the upper end of a hammermill apparatus 14 and a chemical feed proportioner 15 also communicates with the upper end of the hammermill apparatus. In turn, a blower 16 communicates with the lower end of the hammermill apparatus to encourage the flow of ground material from the hammermill apparatus through a discharge duct 17 for removal to a conventional form of cyclone or classification chamber, not shown. From the classification chamber, in accordance with well-known practice, the shredded material is loaded into bags for shipment to the desired end point of use. The entire system may be mounted on suitable skids or frame 20 including a base 22 for the main drive motor 24 for the hammermill elements to be hereinafter described.

Figure 2:
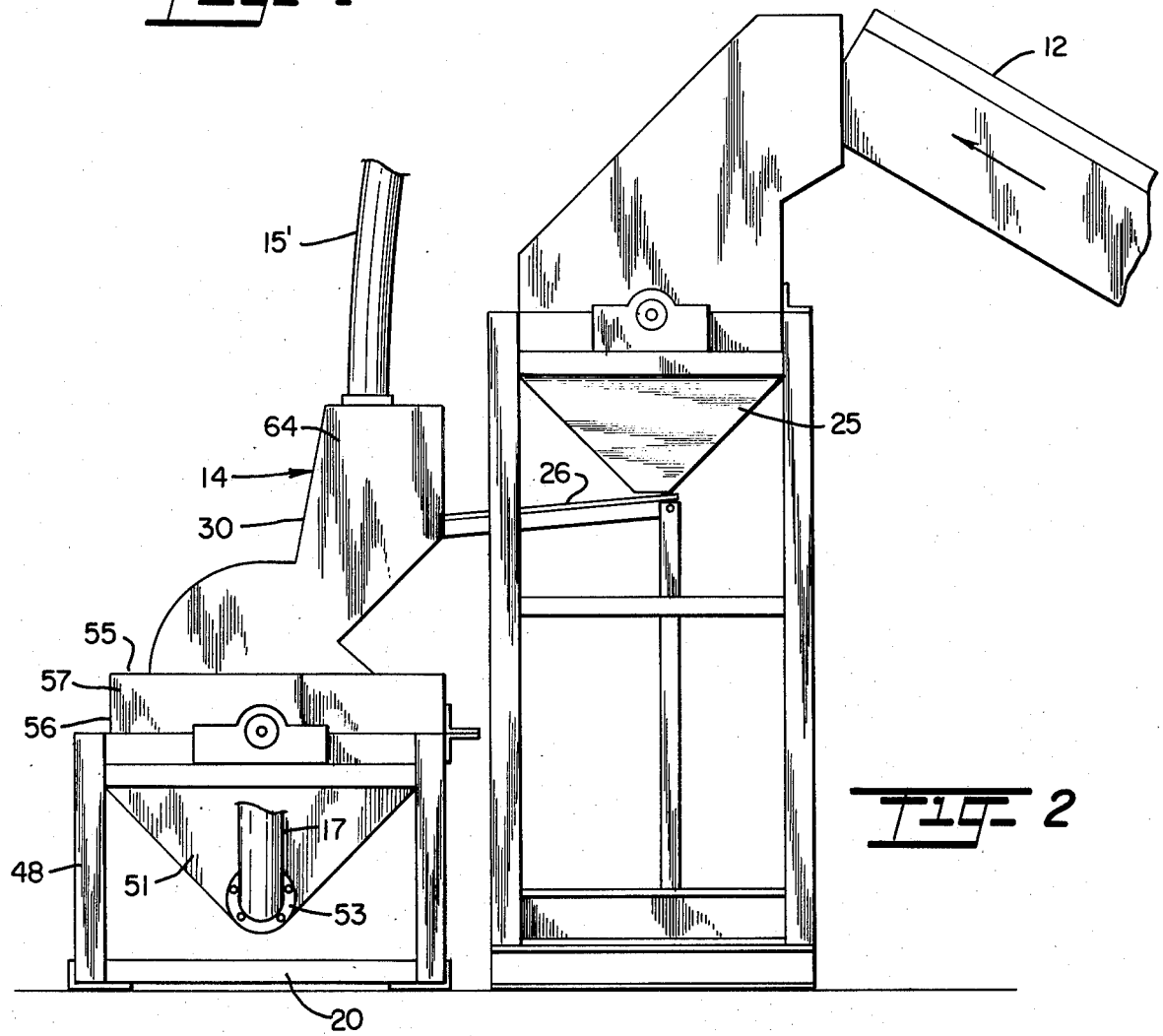
FIG. 2 is a side elevational view of a modified form of the insulation processing system shown in FIG. 1.

A modified arrangement is shown in FIG. 2 wherein the inclined conveyor 12 advances the material into a suitable pre-shredder provided with a downwardly convergent discharge section 25 which delivers the material by gravity into a second inclined conveyor 26 which communicates with the upper end of the hammermill apparatus 14. An alternate form of chemical feed proportioner 15' which forms no part of the present invention communicates with the top of the apparatus 14.

The principle feature of the present invention resides in the construction and arrangement of the hammermill apparatus 14 which as shown in more detail in FIG. 3 comprises an upper feed inlet 30 for gravity flow of cellulose material into a grinding housing 32. The housing has a discharge screen 34 extending around the greater peripheral extent of the wall of the housing so as to permit removal of the ground material into the duct 17 under the influence of the negative pressure created by the blower 16 in the discharge housing to be described. A hammer assembly 35 is disposed for rotation on a central drive shaft 36 which is driven off of the motor drive 24; and as seen also from FIG. 4 a series of discs 38 are evenly spaced along the shaft 36 by spacers 39, the discs 38 and spacers 39 being keyed to the shaft 36 in the manner shown, and hammer elements 40 are disposed in clusters between every other pair of discs. Preferably the hammermill elements 40 are in the form of bars or fingers which are mounted for free swinging movement on shaft 43 and are separated by sleeves or spacers 42 which surround the common shaft 43. Each shaft 43 extends through the outer periphery of the discs in spaced parallel relation to the central shaft 36, and in the form shown there are four outer shafts 43 disposed at equally spaced circumferential intervals 90° apart. The hammer elements 40 are journaled on the shaft 43 so as to be independently rotatable about the shafts 43; however, the centrifugal force of rotation of the discs will force the hammers 40 to extend radially outwardly from the center shaft so as to heat and tear the cellulose material as it is introduced into the grinding housing; yet is capable of yieldingly engaging any large or solid matter introduced until it is finally ground into smaller particles. As such, hammer elements have been employed in this general fashion in other applications, such as, in the grinding of feed material as described and shown in U.S. Pat. No. 4,033,515 to E. A. Barcell assigned to the assignee of the present invention.

In accordance with the present invention, however, the housing wall is of semi-circular configuration with an upwardly directed tangential extension 46 on the entrance side of the housing and a tangential extension 47 on the exit side. An outer generally rectangular frame is provided with legs 48 at each of the four corners so as to support a downwardly convergent discharge housing or enclosure defined by side wall panels 49 and 50 and opposite end walls 51. The discharge duct 17 is secured by a flange 53 to the lower end of the discharge housing and in communication with the interior of the housing to receive the ground material passing through the discharge screen 34.

The housing 32 is centered over the discharge housing by an upper enclosure having an upper horizontal panel 55, opposite side walls 56 and end walls 57. Internal braces 58 of inverted V-shaped configuration extend between the side wall panels 56 and the tangential extensions 46 and 47, respectively, and serve as retainers or hold-downs for the discharge screen 34. In addition, a longitudinal opening 60 is formed in the upper wall panel 55, the opening extending the full length of the housing and being of a width slightly less than the diameter of the housing 32 to receive the upper feed inlet 30.

The upper feed inlet has downwardly convergent, upper and lower side panels 61 and 62 which form a common enclosure with end panels 64 and a top panel 65. The upper panel 61 extends at an angle closer to vertical than the lower panel 62 and merges into an arcuate hood 66 which forms an upward continuation of the tangential extension 46 then curves about a radius approximately that of the wall of the housing to terminate at a point in vertically spaced relation above the drive shaft 36 where it intersects the upper panel 61. In other words the point of intersection between the upper panel 61 and hood 66 is on a center line passing vertically through the drive shaft 36, the hood forming somewhat of an antechamber on the entrance side of the housing, assuming that the hammermill is rotating in a counterclockwise direction as viewed in FIG. 3. Most desirably, the angle of the panel 62 is such that it will direct the paper at an angle to pass it into the housing above the axis of the shaft 36. A deflector 68 of generally V-shaped configuration is formed at the point of intersection of the upper panel 61 and hood 66 with one side 68' of the deflector 68 curving downwardly in a direction which if extended would intersect the lower panel 62 at its juncture with the upper horizontal panel 55. Another deflector 70 of generally V-shaped configuration is positioned at the exit side or in other words at the intersection of the lower panel 62 with the upper horizontal panel 55.

Preferably a damper as represented in the form of a vertical or substantially vertical slot 72 in FIG. 3 is positioned across the lower end of the collector zone opposite to the point of mounting of the discharge duct thereto so as to control the rate at which air is drawn through the grinding cylinder and across the bottom of the collector zone for removal of the ground material. As shown in FIG. 1, a door 73 is slidably positioned over the slot 72 so as to control the amount of air flow as well as the size of material that can be drawn through the discharge screen. For instance, as less air is drawn through the damper the greater the degree of grind before the material will be drawn through the discharge screen. The clearance space between the outer peripheral edges of the hammer elements 40 and the screen 34 is such that the partially ground material will be permitted to gradually build up in the clearance space and, as a result of the arcuate hood or antechamber will tend to set up a reverse or counterflow of material so that partially ground material will tend to collect in the form of a vortex within the negative pressure area of the hood as represented in FIG. 3. Diversion or counterflow of the material is aided somewhat by the deflector 70 at the exit or trailing side of the grinding cylinder. Moreover, the deflector 68' will tend to cause the partially ground material as it is collected in the hood to return into the main stream of paper or cellulose material being fed through the feed inlet. It has been found that the opening size of the throat or most restrictive portion of the feed inlet with respect to the size of the grinding cylinder is critical in order to minimize clogging or jamming of materials being fed through the feed inlet while at the same time encouraging reverse flow of partially ground materials back to the entrance so as to prevent clogging along the interface between the hammer elements 40 and discharge screen 34. For the purpose of illustration and not limitation, for a grinding cylinder with a diameter on the order of 23 inches and having hammer elements in which the radial distance of the outer peripheral edges of the hammer elements are 11 inches from the center so as to leave a clearance space of less than $\frac{1}{2}$ inch, the size of the feed inlet at the throat should be on the order of 12 inches, the throat being considered as that area extending between the deflectors 68' and 70.

Customarily the raw material is in the form of recycled newsprint which may be fed in sheets into the feed inlet or may be partially ground and introduced in the form of bales or chunks of material. It has been found possible in utilization of the preferred embodiment of the present invention to produce 100 bags per hour when the hammermill is rotated at a speed of 1750-2000 rpm. Again the fire retardant material may be introduced into the unground cellulose material or the ground material as the case may be but as such forms no part of the present invention.

Although the present invention has been described with a certain degree of particularity with respect to the pulverization or grinding of cellulose materials, its conformability for use in grinding other forms of material will be readily appreciated. Moreover, the relative dimensioning and sizing of parts is given more for the purpose of illustration; and various modifications and changes may be resorted to in the construction and arrangement of parts comprising the present invention without departing from the spirit and scope thereof as defined by the appended claims.

What is claimed is:

1. In apparatus for grinding and pulverizing cellulose materials and the like wherein an outer frame supports a grinder housing, said grinder housing defined by an outer semicylindrical housing wall provided with discharge openings to permit removal of pulverized materials less than a predetermined size from said housing wall, said frame providing an upper inlet opening above said sidewalls, and grinding means having rotary beater elements is disposed within said housing wall for grinding and pulverizing materials coming into contact therewith into a predetermined size for removal through said discharge openings, the improvement comprising:

(i) feed inlet means for introducing unground materials through said upper inlet opening into communication with the interior of said housing wall, said feed inlet means having opposite, downwardly convergent sidewall portions terminating in a throat region spaced above said upper inlet opening; and (ii) reverse flow means defined by a generally arcuate-shaped hood diverging away from one of said sidewall portions at said throat region of said feed inlet means and extending downwardly toward one wall of said housing wall, said hood disposed on the side of said housing wall in the direction of rotation of said beater elements, said reverse flow means forming a relatively low pressure area with respect to the air pressure within said housing wall whereby to encourage reverse flow of partially ground materials not sufficiently small enough to pass through said discharge openings in a direction counter to the movement of the unground materials through said feed inlet means, and deflector means on said hood being operative to cause the partially ground materials flowing into the low pressure area of said hood to be reintroduced into said throat region for intermixture with the unground materials introduced into said housing wall.

2. In apparatus according to claim 1, said hood having an outer wall section forming a curved extension between the one side of said housing wall and one sidewall portion of said feed inlet means and terminating in said deflector means adjacent to said throat region, said deflector means protruding from said hood toward said throat region and cooperating with said hood to divert the partially ground materials flowing into said low pressure area for reintroduction with the unground material delivered through said feed inlet means into said housing wall.

3. In apparatus according to claim 1, second deflector means protruding from above the other side of said housing wall from a location adjacent to said throat region on the side of said housing wall opposite to said hood.

4. In apparatus according to claim 1, said feed inlet means inclining toward the one side of said housing wall to encourage the introduction of unground material in the direction of rotation of said grinding means.

5. A cellulose insulation processing machine adaptable for grinding sheets of paper into shredded cellulose material comprising:

an elongated housing defined by an outer, generally semi-cylindrical housing wall provided with discharge openings therein, rotary beater elements mounted for rotation about a central axis extending longitudinally of said housing, and an outer frame in outer spaced surrounding relation to said housing wall including discharge means in communication with said discharge openings in said outer wall to induce the removal of cellulose material ground to a preselected size by said rotary beater elements, an upper enclosure disposed over said housing wall and provided with an inlet opening extending the substantial length of said housing wall in communication with the interior of said housing wall, and drive means for rotationally driving said rotary beater elements about said central axis;

feed inlet means extending into communication with said inlet opening, said feed inlet means traversing the substantial length of said housing wall and having opposite sidewall portions converging downwardly and terminating in a throat region spaced above said inlet opening and of a width less than said inlet opening, said feed inlet means extending in a direction to encourage material which is fed into said feed inlet means to enter said inlet opening interiorly along the side of said housing wall in the direction of rotation of said rotary beater elements;

reverse flow means in the form of a generally arcuate, elongated hood traversing the substantial length of said feed inlet means directly above said housing at the point of introduction of materials from said feed inlet means into said inlet opening, said arcuate elongated hood disposed on the side of said housing wall in the direction of rotation of said beater elements and having a lower end extending in a tangential direction away from the side of said housing wall and an upper end converging into one of said sidewall portions of said feed inlet means at the throat region whereby to encourage the reverse flow of partially ground material not passing through said discharge openings upwardly along the side of said housing wall into said hood; and deflector means protruding from the upper end of said arcuate hood to divert the unground materials returning into said hood into the throat region of said feed inlet means for intermixture with the unground materials introduced into said feed inlet means.

6. A cellulose insulation processing machine according to claim 5, the width of said throat region being at least one-half the width of said inlet opening above said housing wall.

7. A cellulose insulation processing machine according to claim 5, said housing wall having tangential extensions above upper edges of said housing wall, said upper enclosure disposed above said tangential extensions and housing wall while leaving an opening across the upper end of said housing of a width substantially equal to the distance between said tangential extensions, said feed inlet means inclining downwardly at an acute angle to said inlet opening and said arcuate, elongated hood extending upwardly from one of said tangential extensions.

8. A cellulose insulation processing machine according to claim 7, said discharge means including a downwardly convergent discharge housing in surrounding relation to said housing wall, a discharge duct communicating with the lower end of said discharge housing, and blower means interposed between said discharge housing and said discharge duct to encourage removal of ground material from the interior of said housing wall through said discharge housing and into said discharge duct.

9. A cellulose insulation processing machine according to claim 8, further including damper control means interposed between said discharge housing and blower to control the capacity of air flow and degree of fineness of the ground material discharged from said cylindrical housing into said discharge housing.

10. A cellulose insulation processing machine according to claim 5, said deflector means protruding into said throat region, said deflector means being generally V-shaped with one side of said V forming a continuation of the curved portion of said hood.

* * * * *

UNITED STATES PATENT AND TRADEMARK OFFICE
CERTIFICATE OF CORRECTION

PATENT NO. : 4,228,964
DATED : October 21, 1980
INVENTOR(S) : John H. Brady

It is certified that error appears in the above—identified patent and that said Letters Patent is hereby corrected as shown below:

IN THE SPECIFICATION:

Column 1, line 21, cancel "joints" and substitute -- joists --.

Column 2, lines 12 and 13, cancel "to Reschke U.S. Pat. No. 1,975,406" and substitute -- U.S. Letters Patent to Reschke No. 1,975,406 --.

Signed and Sealed this

Fourth Day of August 1981

[SEAL]

Attest:

Attesting Officer

GERALD J. MOSSINGHOFF

Commissioner of Patents and Trademarks